Aug. 11, 1925.   1,549,250
J. GARDNER
MOLD FOR PNEUMATIC TUBES
Filed March 27, 1923
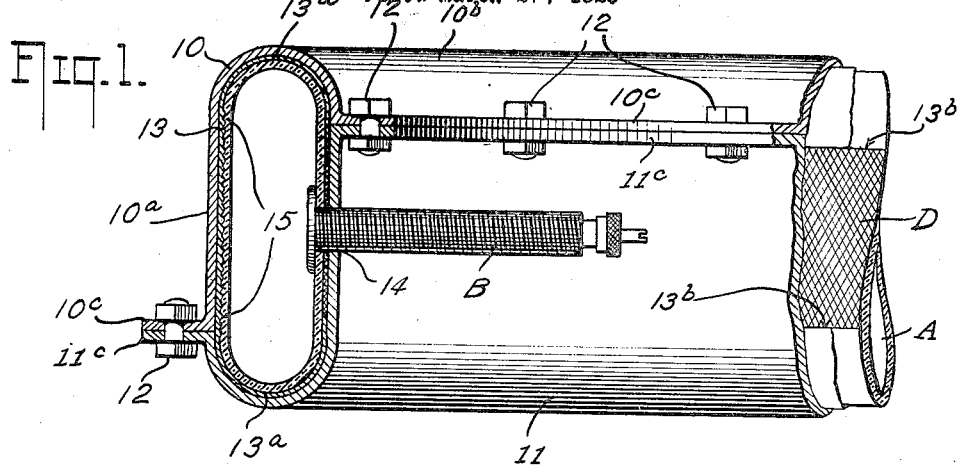
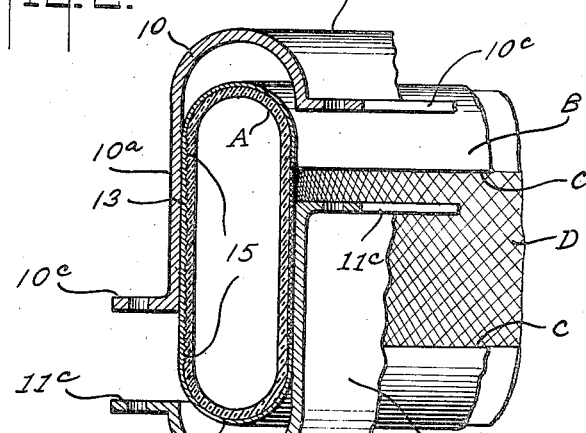
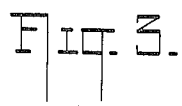
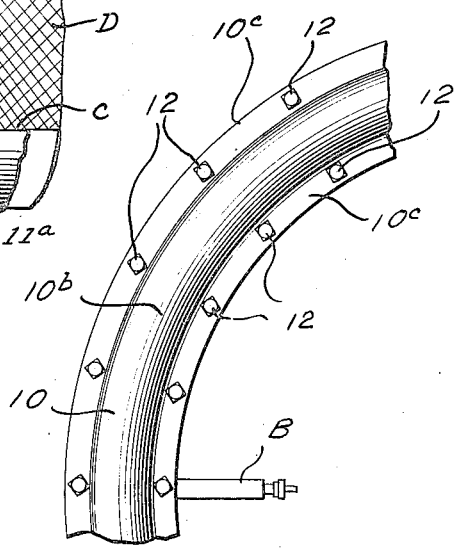
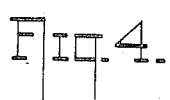
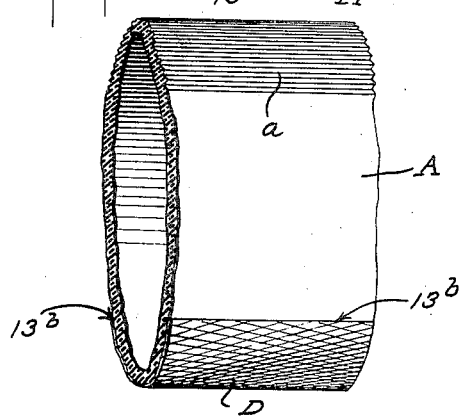
Inventor
JOHN GARDNER.
By his Attorney Patented Aug. 11, 1925.

1,549,250

UNITED STATES PATENT OFFICE.

JOHN GARDNER, OF WEEHAWKEN, NEW JERSEY.

MOLD FOR PNEUMATIC TUBES.

Application filed March 27, 1923. Serial No. 627,949.

*To all whom it may concern:*

Be it known that I, JOHN GARDNER, a citizen of the United States, and a resident of Weehawken, in the county of Hudson and State of New Jersey, have invented certain new and useful Improvements in Molds for Pneumatic Tubes, of which the following is a full, clear, and exact description.

This invention appertains to certain improvements in mold apparatus for the making of pneumatic tubes, and more particularly for use in the vulcanizing of the inner tubes of pneumatic tires for automobiles and the like.

The principal object of the invention is to provide for an apparatus of the character mentioned, and one embodying an extremely simplified and inexpensive construction and arrangement of parts, such as will be highly efficient in operation, of a nature to facilitate the vulcanizing operation by transmitting the heat to the enclosed tube quickly, and easy to assemble with the tube fabric in position therein and to take apart for the removal of the completed tube therefrom.

With the foregoing and other equally important objects in view, the invention resides in the certain new and useful construction and arrangement of parts as will be hereinafter more fully described, set forth in the appended claims, and illustrated in the accompanying drawing, in which:—

Figure 1 is a fragmentary section through a preferred embodiment of the mold as it appears when ready for the vulcanizing operation, Figure 2 is a similar section with the parts of the mold slightly separated to show the cooperation of the inner mold member with the tube to be vulcanized.

Figure 3 is a fragmentary plan view of the mold in its assembled condition, and, Figure 4 is a fragmentary sectional view of the pneumatic tube after the same has been vulcanized and removed from the mold.

Referring to the drawing, the numerals 10 and 11 indicate the two outer complemental parts of the mold, which when assembled together, form a mold body of circular form and substantially oval in cross-section. The mold parts 10 and 11 are preferably made from sheet metal, and are each shaped to provide substantially flat side wall portions $10^a$ and $11^a$ with one side edge thereof bent to form curved end walls $10^b$ and $11^b$, so that when the parts are assembled, the free side edge of the curved end wall of each part or section will abut the free side edge of the other of the parts or sections, to form the closed mold body, substantially as shown. The complemental side edges of the flat side walls $10^a$ and $11^a$ and the curved end walls $10^b$ and $11^b$ are preferably out-turned to provide abutting flange portions $10^c$ and $11^c$, respectively, which are provided with a series of equidistantly spaced and registering openings for the reception therein of suitable fastenings, such as the bolts 12, by means of which the parts of the mold will be securely clamped together. Thus these flange joints are offset or staggered, one with respect to the other, at opposite sides of the mold proper.

An inner mold body 13 is provided, and the same is preferably made from a sheet metal of a much lighter gauge than that of the mold parts or sections 10 and 11, and is shaped to provide a flat side wall portion having its opposite side edges bent on curved lines to provide end walls $13^a$ conforming to the walls $10^b$ and $11^b$ of the mold proper, when positioned therein. The free side edges of the curved walls $13^a$ of the inner mold body 13, are spaced apart as at $13^b$, but the edge portion of the curved wall $13^a$ thereof which is complemental to the curved wall $10^b$, of the mold proper, is arranged to extend across the joint between the flanges $10^c$ and $11^c$, substantially as is shown in Figure 1.

In the operation of the mold, a pneumatic tube A, formed of the ordinary rubber or rubberized fabric in its raw state, is seated within the inner mold body 13, through the space formed between the opposed side edges of the curved wall portions $13^a$ thereof, when the same will be placed between the previously separated parts or sections 10 and 11, in the manner as shown in Figure 2, and, when the latter are moved toward one another to bring the flanges $10^c$ and $11^c$ into abutting relation, the bolts 12 will be tightened in position to securely clamp the parts or sections 10 and 11 about the inner mold body 13, and effect a similar clamping action on the latter with respect to the pneumatic tube A. With the parts thus assembled and secured together, the mold is ready to be placed in a vulcanizing pot and heat treated as in the usual manner, and, by reason of the comparatively lightweight, sheet metal construction of both the inner and outer mold bodies, the heat is more quickly transmitted to the tube fabric, and the vulcanizing effects thereon are accomplished in a rapid and uniform manner.

If desired, a pneumatic tire tube may be vulcanized with its inflation valve B applied thereto, and, for the purpose, an opening 14 will be provided in one of the flat side walls of the outer mold parts or sections 10 and 11, for the projection of the valve B outwardly therethrough. The valve B will be preferably centered within the space provided between the opposed side edges of the inner mold body 13, which space is provided to expose the inner circumferential wall of the tube A, which is usually covered with a strip of fabric to protect this wall portion from the rust of a wheel rim when the tube is placed in service within a tire casing, to the direct heating effect of the opposed wall portion of one of the outer mold parts or sections 10 and 11.

The invention also contemplates the corrugating of the inner side of the flat wall portion of the inner mold body 13, as at 15, so that the outer circumferential wall or tread portion of the vulcanized tube A will be similarly corrugated or roughened, as at $a$, to prevent slippage of the same when placed in service within a tire casing. These corrugations $a$ are preferably extended one parallel to the other and circumferentially of the outer tread surface of the tube A, and in addition to increasing the friction effect between the tube and the enclosing wall of a tire casing, they also allow for a circulation of air between the tube and casing and a lateral expansion of the tube to avoid the consequences of puncture.

From the foregoing, it will be readily apparent that, while a preferred embodiment of the mold has been described and illustrated herein in specific terms and details of construction and arrangement, various changes in and modifications of the same may be resorted to without departing from the spirit of the invention, or the scope of the claim appended hereto.

Having thus fully described the invention, what is claimed, is:—

A pneumatic tube mold comprising a pair of annular mold sections of counterpart formation arranged to form a hollow body of oval cross-section, each of said sections consisting of a metal blank bent in U shaped cross-section to provide a long side wall and a short side wall beyond the bend, lateral outturned flanges at the ends of said walls and integral therewith and having spaced perforations therethrough, said sections being assembled with the short wall flange of one abutting the long wall flange of the other to provide offset mold joints, a liner plate adapted to lie within said sections to cover the joints thereof when assembled, and mold securing bolts for engagement through said flange apertures to bind the mold sections in closed position.

JOHN GARDNER.